(12) United States Patent
Zinn et al.

(10) Patent No.: US 7,320,497 B2
(45) Date of Patent: Jan. 22, 2008

(54) POWER LIFT GATE FOR AUTOMOTIVE VEHICLE

(75) Inventors: Gregory B. Zinn, Canton, MI (US); J. Michael McKeon, Canton, MI (US); Barton Heldke, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/733,852

(22) Filed: Apr. 11, 2007

(65) Prior Publication Data

US 2007/0182351 A1   Aug. 9, 2007

Related U.S. Application Data

(62) Division of application No. 11/163,662, filed on Oct. 26, 2005, now Pat. No. 7,219,945.

(51) Int. Cl.
*B60J 5/00* (2006.01)
(52) U.S. Cl. .......................... 296/146.4; 49/26
(58) Field of Classification Search ............ 296/146.4, 296/56, 106, 146.8; 49/26, 27, 28
See application file for complete search history.

(56) References Cited

U.S. PATENT DOCUMENTS

| | | | | |
|---|---|---|---|---|
| 5,563,483 A * | 10/1996 | Kowall et al. | ................ | 49/26 |
| 5,592,777 A * | 1/1997 | Petri et al. | ................ | 49/28 |
| 5,977,732 A * | 11/1999 | Matsumoto | ................ | 49/28 |
| 6,145,918 A * | 11/2000 | Wilbanks, II | ............ | 296/146.1 |
| 6,185,868 B1 * | 2/2001 | Kato | ................ | 296/56 |
| 6,297,605 B1 * | 10/2001 | Butler et al. | ................ | 49/26 |
| 6,329,779 B1 * | 12/2001 | Pimley et al. | ............ | 318/445 |
| 6,411,054 B1 * | 6/2002 | Van Wiemeersch | ........ | 318/445 |
| 6,750,624 B2 | 6/2004 | Haag et al. | | |
| 6,779,302 B2 * | 8/2004 | Harrison et al. | ............ | 49/26 |
| 6,836,209 B2 * | 12/2004 | Ploucha | ................ | 49/26 |
| 6,840,113 B2 * | 1/2005 | Fukumura et al. | ........ | 318/469 |
| 7,000,352 B2 * | 2/2006 | Ishihara et al. | ........ | 296/146.8 |
| 7,017,973 B2 * | 3/2006 | Sera et al. | ............ | 296/146.4 |
| 7,226,112 B2 * | 6/2007 | Ward | ................ | 296/146.8 |
| 2004/0095250 A1 * | 5/2004 | Chapman et al. | ........ | 318/471 |
| 2007/0024431 A1 * | 2/2007 | Touge | ................ | 340/436 |

* cited by examiner

*Primary Examiner*—Kiran B. Patel
(74) *Attorney, Agent, or Firm*—Gigette M. Bejin; Dickinson Wright PLLC

(57) ABSTRACT

A powered lift gate for an automotive vehicle includes a lift gate door hinged to a vehicle body. A motor system which opens and closes the door is operated by a controller coupled to a primary obstacle detection system which senses operation of the motor itself, and by a secondary detection system which directly senses an object interposed between a margin of the door and the door opening panel. A pinch protection member interposed between a marginal zone of the door and the door opening panel includes a resilient element having sufficient strength to support an object positioned between the door and the door opening panel such that the primary obstacle detection system will be triggered when the door and motor develop a predetermined compressive force upon the object. The predetermined compressive force is selected to allow normal operation of the lift gate, without subjecting an obstructing object to excessive crushing force.

2 Claims, 5 Drawing Sheets

POWER LIFT GATE FOR AUTOMOTIVE VEHICLE

RELATED APPLICATION(S)

The present application is a divisional of U.S. patent application Ser. No. 11/163,662 now U.S. Pat. No. 7,219,945, filed Oct. 26, 2005, and incorporated herein by reference.

TECHNICAL FIELD

The present invention relates to a powered vehicle door, such as a horizontally hinged lift gate. Closure of the door against an intruding object is prevented by a system utilizing two types of sensing.

BACKGROUND

Power driven doors installed in vehicles usually include safety features intended to prevent closure of the door upon an intruding, or foreign, object such as an item protruding from the vehicle doorway, or the hand of a vehicle passenger. U.S. Pat. No. 6,297,605 discloses a power lift gate in which a pinch sensing arrangement is mounted at the upper part of the vehicle lift gate. The pinch sensor of the '605 patent is an electrical switch. Unfortunately, the system of the '605 patent does not provide more than minimal protection for objects intruding upon the lower part of a lift gate adjoining the vehicle's taillights. A system and method according to the present invention provides not only protection in the upper part of the lift gate, but also improves the protection offered by the lower portion of the lift gate in the vicinity of the vehicle's taillights.

SUMMARY

A power lift gate for an automotive vehicle includes a lift gate door hinged to a vehicle body and having an operating path for opening the door and closing the door to a door opening panel. A motor system opens and closes the door and is operatively connected with a controller. A primary obstacle detection system, which is operatively connected with the motor system and the controller, determines when operation of the motor system is being inhibited by an object in the path of the door. Obstructing objects may include items placed upon the floor of the vehicle's passenger compartment, or other items extending through the door opening served by the lift gate.

The present method and system further includes a secondary obstacle detection system which is operatively connected with the controller. This secondary obstacle detection system includes a sensor assembly for determining when an object is interposed between a portion of the door's margin and a door opening panel. Finally, the present system includes a pinch protection member interposed between at least one marginal zone of the door and the door opening panel. The pinch protection member includes a resilient element mounted upon a carrier, with the resilient element having sufficient strength to resiliently support an object positioned between the resilient element and the door such that the primary obstacle detection system will be triggered when the door and motor develop a predetermined compressive force upon the object, but without subjecting the obstructing object to excessive compressive force. In one embodiment, the predetermined maximum compressive force is preferably in the range of 190 to 210 Newtons.

The secondary obstacle detection system sensor assembly and the pinch protection member preferably occupy different marginal zones of the door. For example, the secondary obstacle detection system sensor is preferably applied to an upper portion of the door or lift gate and the pinch protection member is preferably applied to another portion of the door, such as adjacent the interface between the vehicle's taillights and liftgate. The pinch protection member itself preferably includes a rigid carrier supporting a resilient element having a T-shaped elastomeric element with a web attached to the carrier and a capital supported by the web. The web and the capital deform elastically in compression and bending in response to compressive force imposed by the door and the motor system upon an object intruding into the closing space of the door.

According to another aspect of the present invention, a primary obstacle detection system includes a detector for determining operating speed of the door's motor drive system. The detector may comprise an optical detector associated with a rotating motor shaft, or other type of detector known to those skilled in the art and suggested by this disclosure.

According to another aspect of the present invention, a method for controlling the closing of a powered vehicle door includes the steps of initiating closure of the door by means of a motor drive and monitoring the output of an object detection system disposed between the door and a door opening panel. The method further includes the steps of monitoring the speed of the motor drive, and finally, in the event that either the output of the object detection sensor or the speed of the motor drive indicate that an obstruction is positioned between the door and the door opening panel, reversing the motor drive so as to open the door.

It is an advantage of the present system that a powered lift gate or door may be safeguarded against unwanted closing against an object interposed between the door and the door opening panel.

It is a further advantage of a system according to the present invention that hazard protection may be furnished about the entirety of the sides and lower portion of a lift gate.

It is a further advantage of the present system that the present pinch protection feature may be implemented at a reasonable cost and with a minimal increase in system complexity.

Other advantages, as well as objects and features of the present invention, will become apparent to the reader of this specification.

DETAILED DESCRIPTION OF THE PREFERRED EMBODIMENTS

Figure 1:
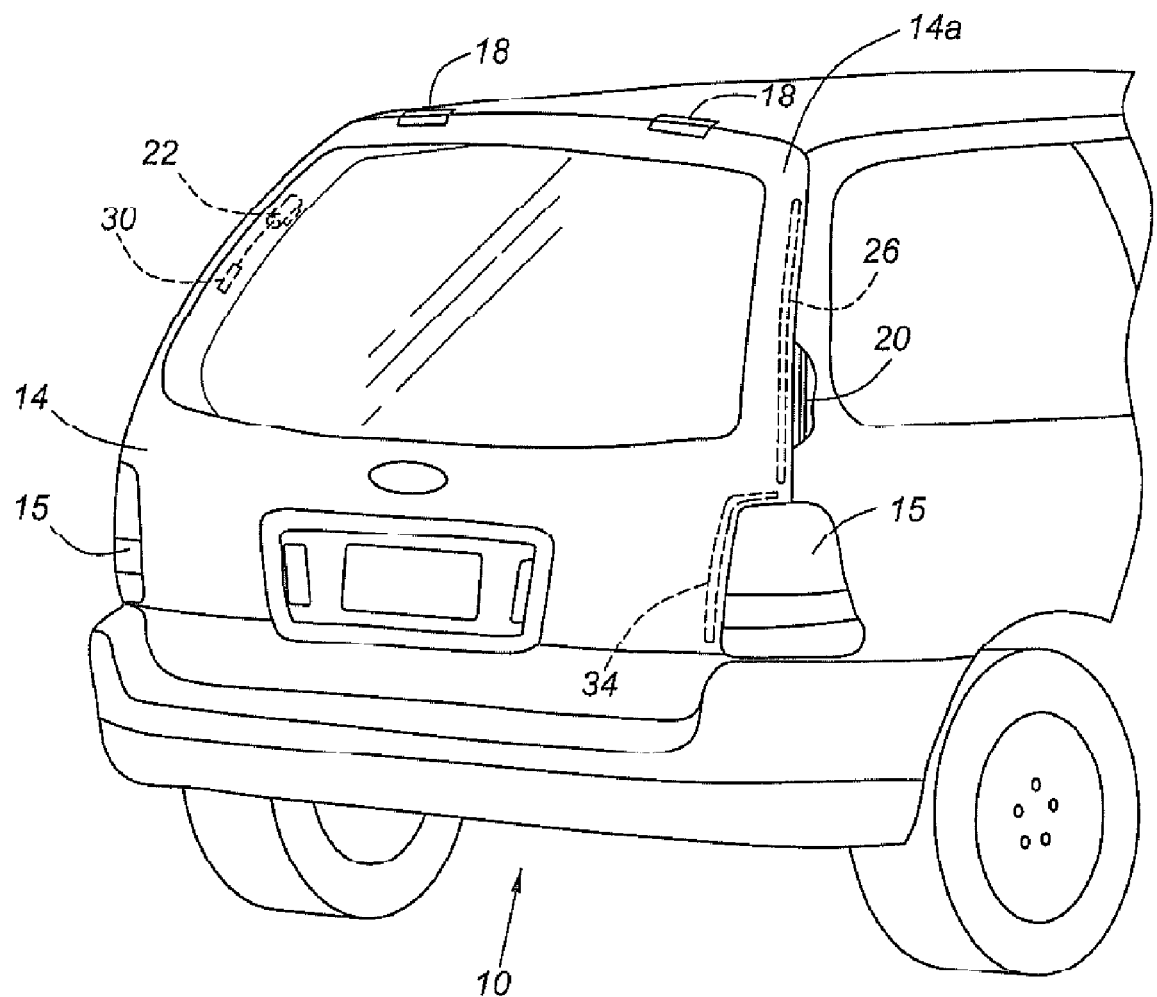
FIG. 1 is a perspective view of a sport utility vehicle having a lift gate according to the present invention.

As shown in FIG. 1, vehicle 10 has a rear door, or lift gate, 14. Door 14 is mounted for rotation upon hinges 18. Motor system 22, which is operated by controller 30, moves door 14 into its open and closed positions. FIG. 1 also shows the location of a linear switch or sensor, 26, which is mounted to an upper portion of door opening panel 20. A pinch protection member, 34, is attached to a lower portion of door 14 adjoining taillights 15 of vehicle 10. Those skilled in the art will appreciate in view of this disclosure that sensor 26 could be mounted to either door 14, or to door opening panel 20. Similarly, pinch protection member 34, too, could be applied to either door 14 or to opening panel 20.

Figure 2:
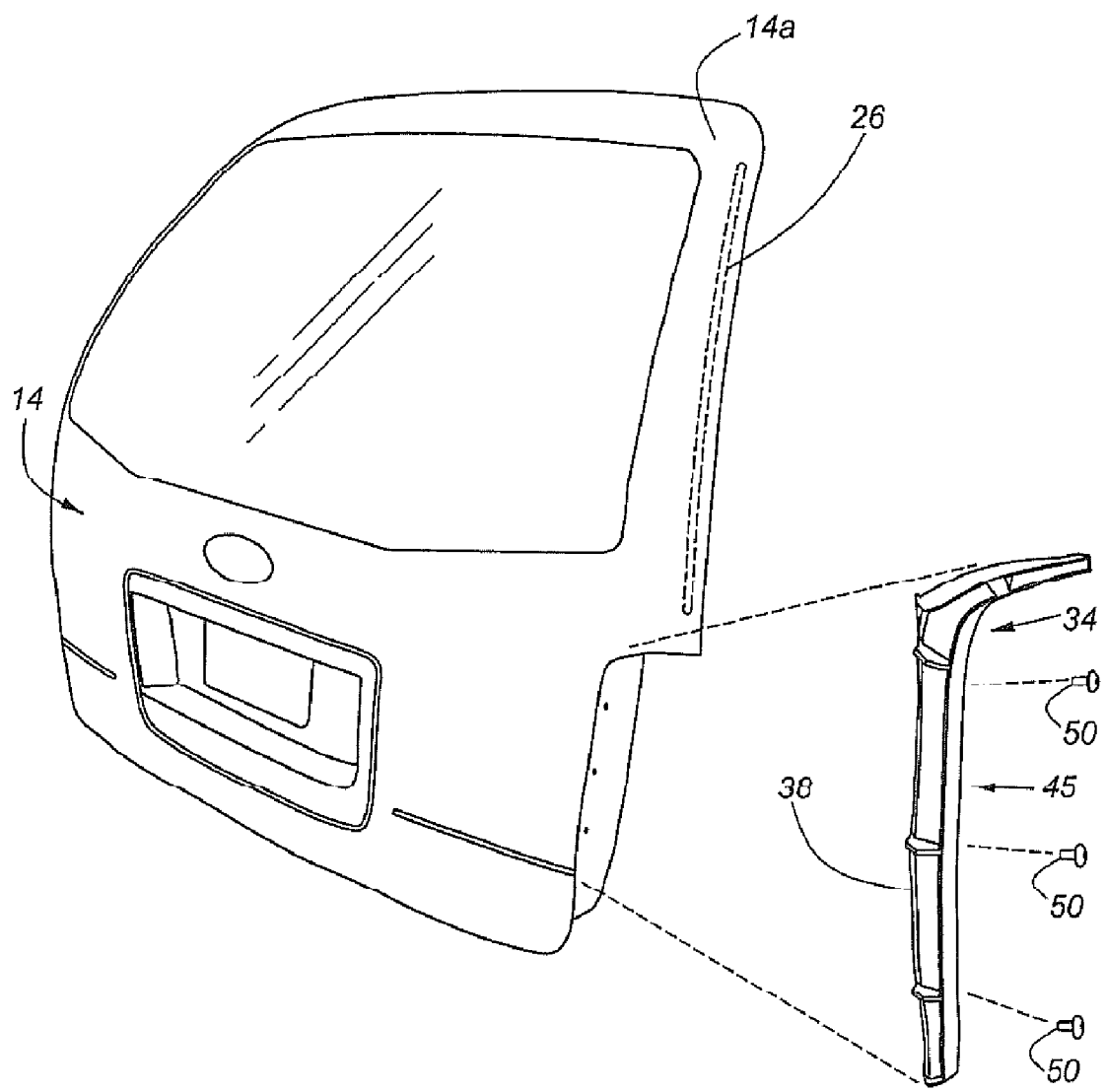
FIG. 2 is a perspective view of the lift gate shown in FIG. 1, showing two types of protective devices installed in the lift gate.

FIG. 2 is an exploded view showing the mounting orientation of pinch protection member 34, which is mounted to lift gate 14 by means of fasteners 50. Also, as further shown in FIG. 2, linear switch sensor 26 is mounted to an inner portion of the door 14. Linear switch sensor 26, combined with controller 30, functions as a secondary obstacle detection system for determining when an object is interposed between a margin, 14a, of door 14, and door opening panel 20 (FIG. 1). An object positioned between linear switch 26 and door margin 14a will cause switch 26 to close; this closure will be detected by controller 30, which will direct motor system 22 either to reverse the movement of door 14, or declutch drive motor 28 from door 14, thereby allowing door 14 to be pushed open manually.

Figure 6:
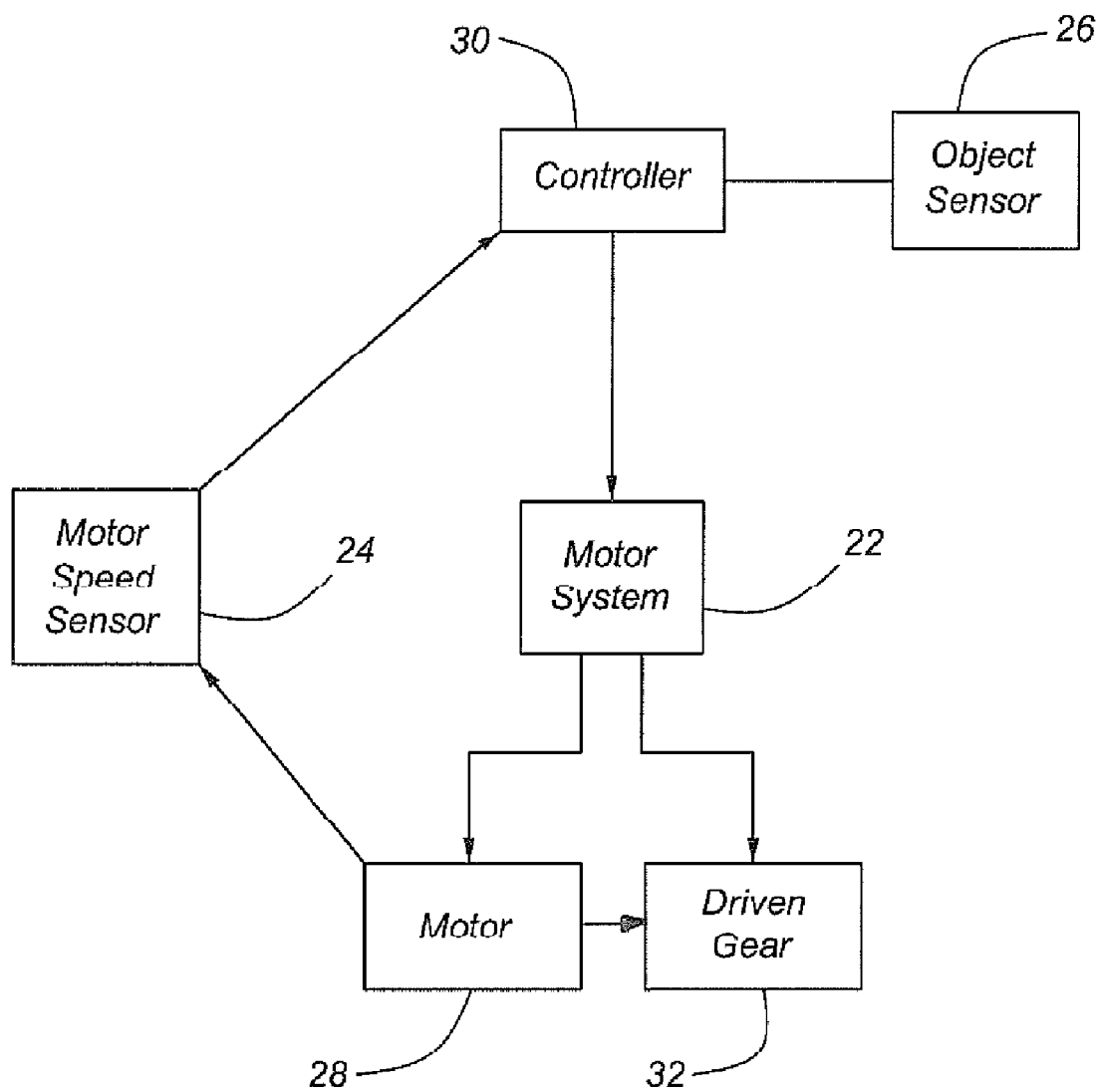
FIG. 6 is a block diagram of a system according to the present invention.

A primary obstacle detection system according to the present invention includes motor system 22, and controller 30. As shown in FIG. 6, motor 28 is coupled to a motor speed sensor, 24, which feeds information to controller 30. Motor speed sensor 24 may comprise either an optical device such as a shutter wheel, or other types of sensing devices for detecting rotational motion and known to those skilled in the art and suggested by this disclosure. In any event, if door 14 closes upon an object having a predetermined sufficient size, motor speed sensor 24 will advise controller 30 that the operating speed of motor 28 has decreased to a point at which an obstacle has been sensed.

Figure 3:
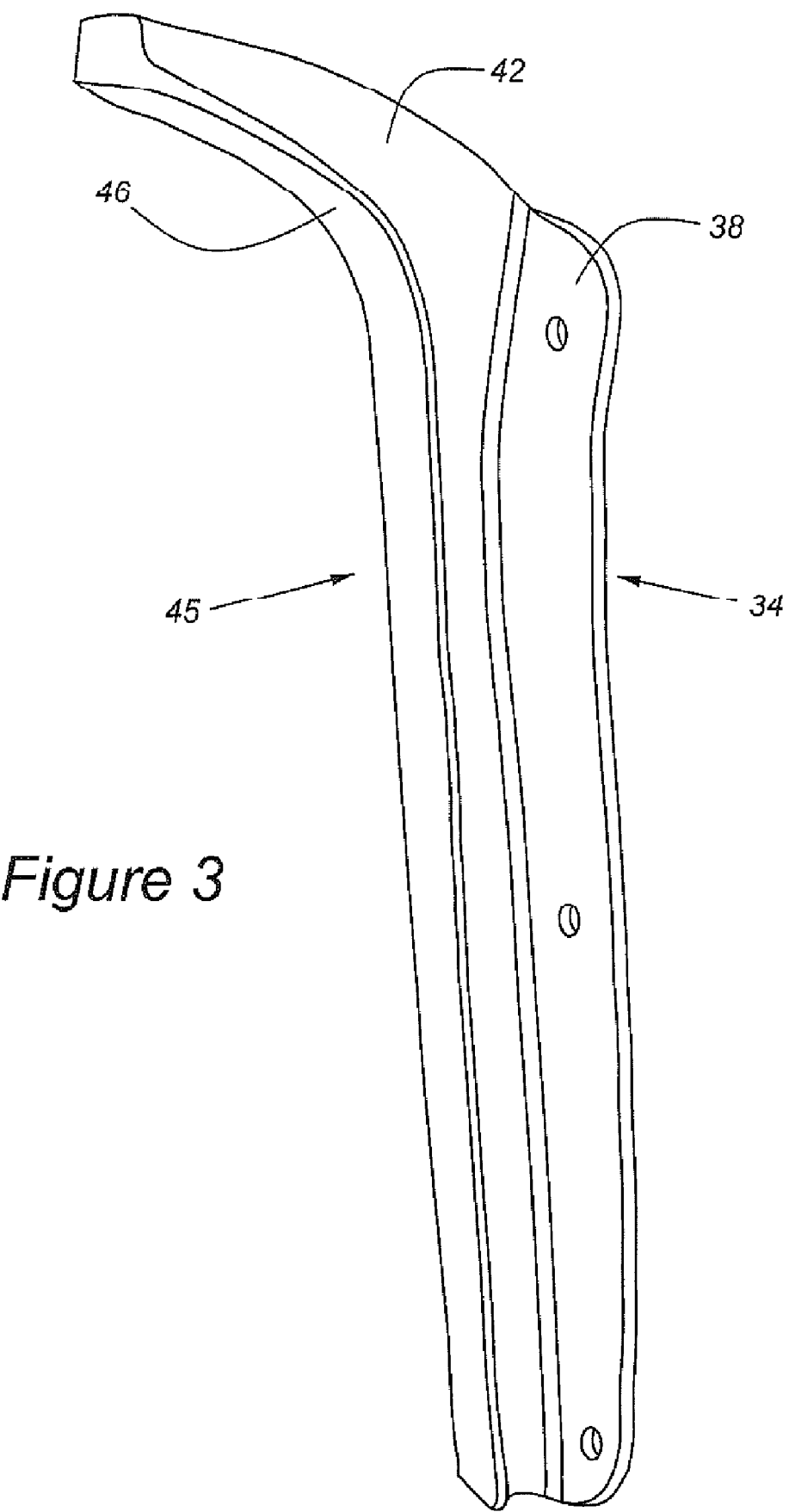
FIGS. 3 and 4 are perspective views of a pinch protection member which is attachable to either the lift gate or door opening panel of a vehicle.
Figures 4, 5:
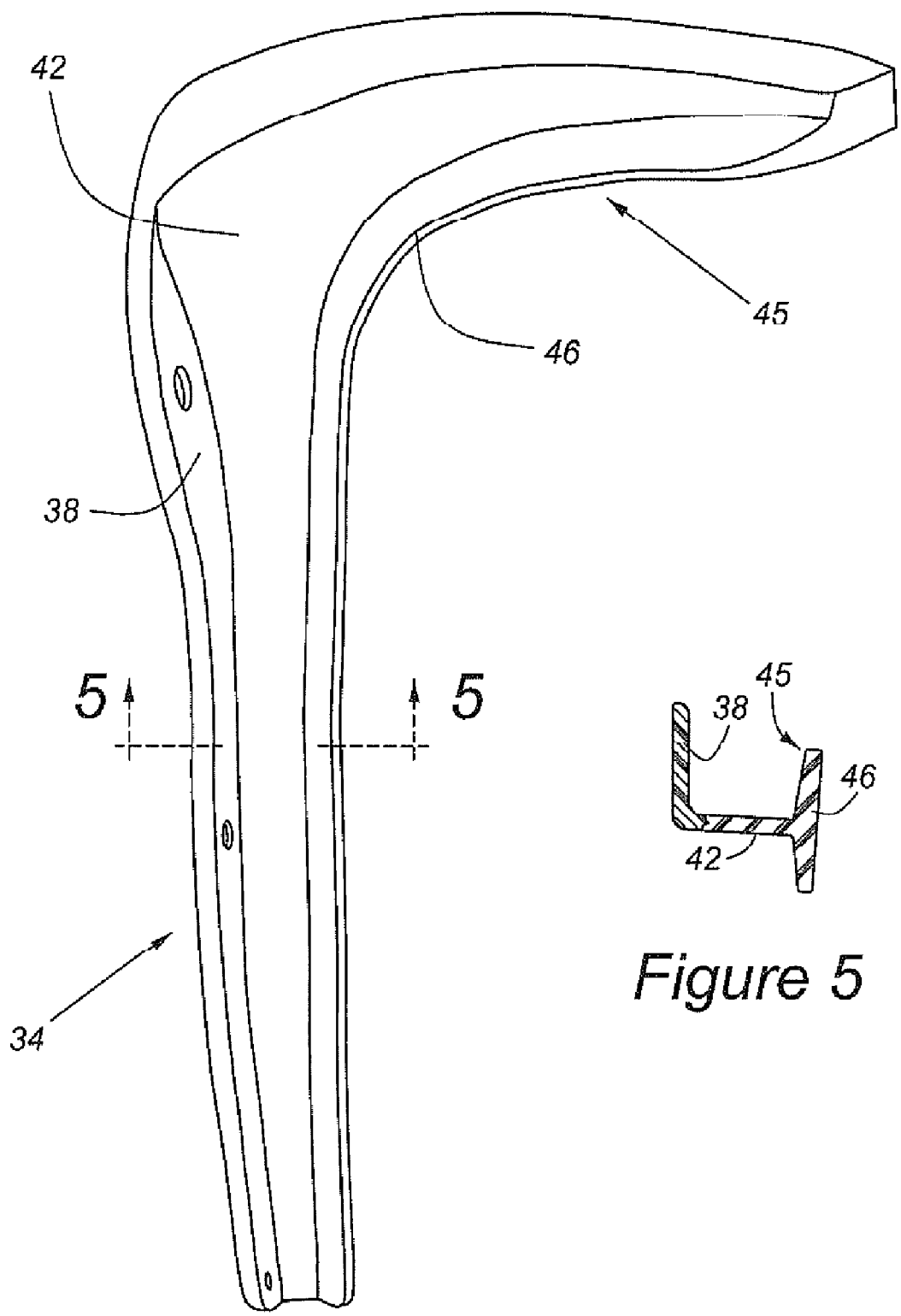
FIG. 5 is a sectional view of a pinch protection member shown in FIG. 4, taken along the line 5-5 of FIG. 4.

As shown in FIGS. 3, 4 and 5, pinch protection member 34 includes carrier 38 of high strength engineering plastic, such as glass filled polypropylene. A resilient element, 45, is overmolded upon carrier. Resilient element 45 includes web 42, which is topped by capital 46 to create a T-shaped elastomeric element.

The sectional shape of web 42 and capital 46 are shown with particularity in FIG. 5. Web 42 and capital 46 have sufficient strength to resiliently support an object, such as a finger, or other object positioned between door 14 and door opening panel 20, such that motor 28 will slow to an extent at which the signal from sensor 24 will be interpreted by controller 30 as being indicative of an obstacle before a crushing threshold has been exceeded. Thereafter, controller 30 will stop motor 28 and either reverse the direction of motor 28 or declutch motor 28 from driven gear 32. Driven gear 32 includes a power transmission system selectively coupled to motor 28; driven gear 32 may be drawn from any one of a number of automotive door operators, including cable and linkage actuated systems, and other types of drive systems known to those skilled in the art and suggested by this disclosure.

In essence, the primary obstacle detection system is triggered when door 14 and motor system 22 develop a predetermined compressive force upon the object, such as a finger or other object, as indicated by the output of motor speed sensor 24. This compressive force is a calibratable quantity which is preferably about 190 to 210 Newtons. The amount of force required to slow motor system 22 sufficiently to trigger reversal or declutching of motor 28 may be tuned by changing the compression and bending characteristics of resilient elements 42 and 46. Both web 42 and capital 46 deform elastically in compression and bending in response to compressive force imposed by door 14 and motor drive system 22 upon an object positioned between door 14 and door opening panel 20.

According to another aspect of the present invention, a method for controlling the closing of powered vehicular door 14 includes the steps of initiating closure of the door by means of motor system 22, and monitoring the output of motor speed sensor 24 which is operatively connected to motor 28. The present method further includes the step of monitoring output of an object detection sensor disposed between door 14 and door opening panel 20. Finally, in the event that either the output of object detection sensor 26, or the speed of motor 28, as detected by motor speed sensor 24, indicate that an obstruction is positioned between door 14 and door opening panel 20, motor system 22 will be placed in a non-closing configuration by either stopping and reversing motor 28, so as to open door 14, or by declutching motor 28 from driven gear 32, so as to allow door 14 to be opened manually.

While particular embodiments of the invention have been shown and described, numerous variations and alternate embodiments will occur to those skilled in the art. Accordingly, it is intended that the invention be limited only in terms of the appended claims.

What is claimed is:

1. A powered door system for an automotive vehicle, comprising:
   a door hinged to a vehicle body and having an operating path for opening the door and closing the door to a door opening panel;
   a motor system for opening and closing said door;
   a controller for operating said motor system;
   a speed-measuring, primary obstacle detection system, operatively connected with said motor system and said controller, for determining when operation of said motor system is being inhibited by an object in the path of said door;
   a secondary obstacle detection system, operatively connected with said controller, with said secondary obstacle detection system comprising a sensor assembly for determining when operation of said motor system is being inhibited by an object interposed between a margin of the door and a door opening panel; and
   a pinch protection member interposed between at least one marginal zone of said door and said door opening panel, with said pinch protection member comprising a resilient element mounted upon a carrier, with said resilient element having a compressive modulus of elasticity and bending strength which are sufficient to permit an object positioned between said resilient element and said door opening panel to trigger said primary obstacle detection system before said motor system develops a compressive force having a magnitude in excess of a predetermined threshold value.

2. A powered door system according to claim 1, wherein said sensor assembly of said secondary obstacle detection system is mounted to a door opening panel of said vehicle, and said pinch protection member is mounted to said door.

* * * * *